(12) United States Patent
Degrauwe et al.

(10) Patent No.: US 6,588,661 B2
(45) Date of Patent: Jul. 8, 2003

(54) SYSTEM AND METHOD FOR WIRELESS COMMUNICATION BETWEEN SEVERAL TRANSCEIVERS, ARRANGED RESPECTIVELY IN SEVERAL DELIMITED SPACES, AND PORTABLE ELECTRONIC UNITS

(75) Inventors: Marc Degrauwe, Chez-le-Bart (CH); Olivier Desjeux, Le Landeron (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 10/084,058

(22) Filed: Feb. 28, 2002

(65) Prior Publication Data

US 2002/0134833 A1 Sep. 26, 2002

(30) Foreign Application Priority Data

Mar. 23, 2001 (EP) .............................. 01810307

(51) Int. Cl.⁷ ................................................. G06K 5/00
(52) U.S. Cl. ...................................... 235/382; 235/384
(58) Field of Search ............................... 235/375, 382, 235/384; 340/928, 825, 933; 701/117; 342/42

(56) References Cited

U.S. PATENT DOCUMENTS

| | | | |
|---|---|---|---|
| 5,440,109 A | * | 8/1995 | Hering et al. ............... 235/384 |
| 5,804,810 A | | 9/1998 | Woolley et al. |
| 5,805,082 A | * | 9/1998 | Hassett ....................... 340/928 |
| 5,809,142 A | * | 9/1998 | Hurta et al. .................. 705/68 |
| 5,859,415 A | * | 1/1999 | Blomqvist et al. .......... 235/384 |
| 6,107,910 A | * | 8/2000 | Nysen ........................ 340/10.1 |
| 6,342,844 B1 | * | 1/2002 | Rozin .......................... 340/933 |

FOREIGN PATENT DOCUMENTS

| | | |
|---|---|---|
| EP | 0 589 046 A1 | 5/1994 |
| EP | 1 022 674 A2 | 12/1999 |

* cited by examiner

Primary Examiner—Karl D. Frech
Assistant Examiner—Edwyn Labaze
(74) Attorney, Agent, or Firm—Sughrue Mion, PLLC

(57) ABSTRACT

System for communication between a plurality of transceivers, transmitting in particular at a high frequency and arranged respectively in a plurality of delimited spaces each having at least one entrance, and portable electronic units fitted with means for radio-communication with the plurality of transceivers, in particular with a view to detecting each of them penetrating one of the delimited spaces. The communication between the transceivers and the portable electronic units for neighboring delimited spaces is effected at different exclusive frequencies or frequencies of sub-sets of frequencies associated with the exclusive frequencies. In order to do this, devices for occupying an exclusive frequency are provided which include listening circuits (30, 32, 34, 36, 38, 46, 48) for determining whether an occupied signal is present on any frequency of a set of exclusive frequencies able to be selected and/or whether a determined amplitude threshold is received for this frequency, and transmission circuits (30, 52, 54, 56, 58) arranged to transmit an occupied signal in a selected exclusive frequency. This system thus prevents disturbances or interference between portable units located in a delimited space and a transceiver arranged in a neighboring delimited space.

14 Claims, 4 Drawing Sheets

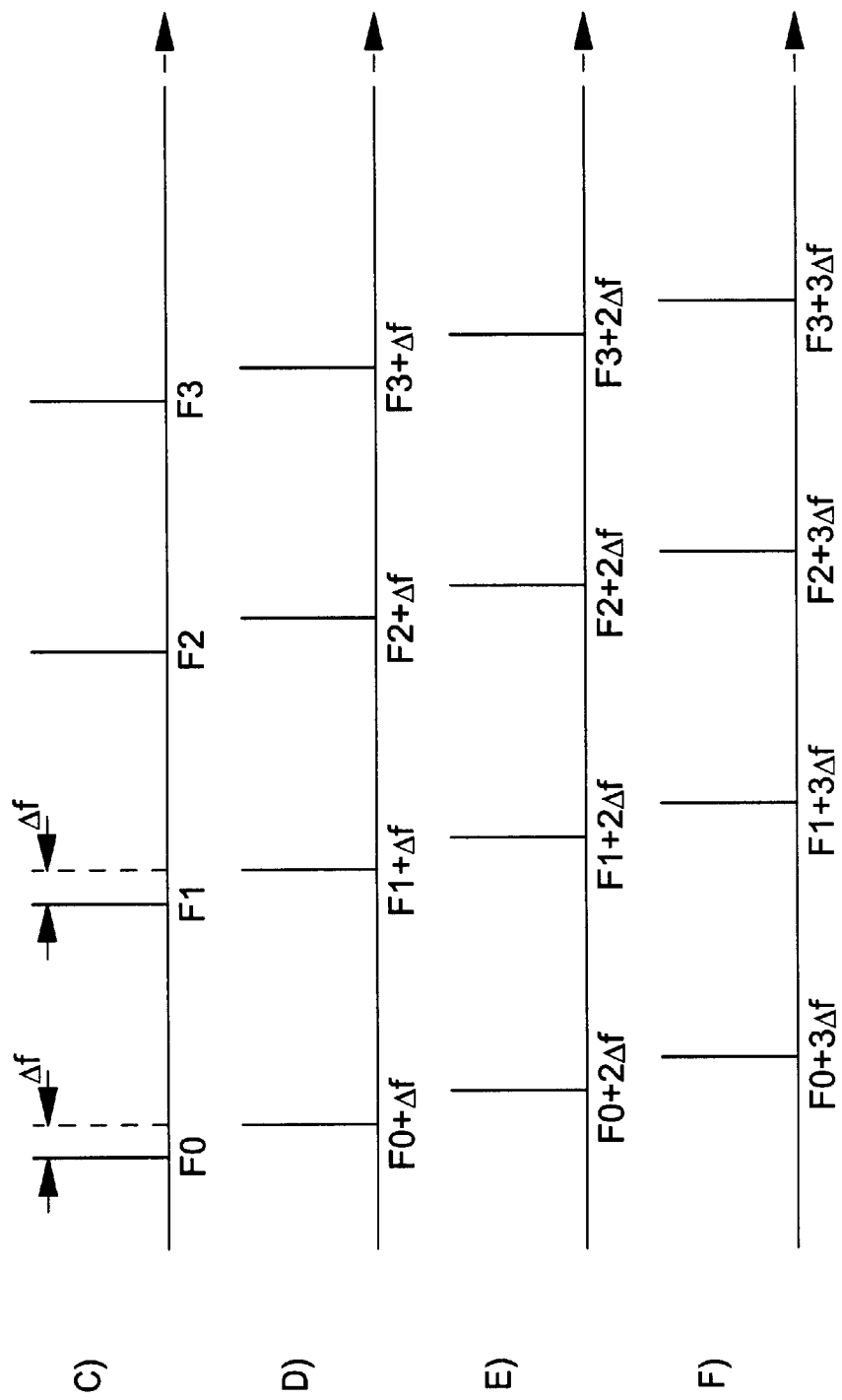

SYSTEM AND METHOD FOR WIRELESS COMMUNICATION BETWEEN SEVERAL TRANSCEIVERS, ARRANGED RESPECTIVELY IN SEVERAL DELIMITED SPACES, AND PORTABLE ELECTRONIC UNITS

BACKGROUND OF THE INVENTION

The present invention concerns a system and a method for wireless communication between a plurality of transceivers, arranged respectively in a plurality of delimited spaces each having at least one entrance, and portable electronic units provided with means of radio-communication with said plurality of transceivers, particularly with a view to detecting each of said electronic units which penetrate one of said delimited spaces. "Entrance" is used broadly to mean any door or pathway giving access to a delimited space concerned.

The present invention concerns more particularly a system and a method for communication between persons or objects provided with said portable electronic units and a plurality of transceivers arranged in a plurality of neighbouring delimited spaces or spaces located in proximity to each other. It will be noted that the delimited spaces may be fixed locations, such as delimited zones of a fun fair or a sports centre, or mobile locations such as compartments or carriages of a means of public transport.

A system for detecting individuals or objects provided with transponders or electronic tickets is known from European Patent Application No. 1,065,635. According to the method disclosed in this document, a low frequency communication is provided at the entrance to the delimited space, particularly of the order of a hundred KHz, allowing localised communication between a transmitter or reader and the portable transponders. Then, a high frequency communication is provided between a high frequency transmitter, particularly of the order of hundreds of MHz or more, located inside the delimited space and the transponders located in the space when the doors providing access to the space are closed. However, a high frequency communication may occur at any time as soon as the transponders are awakened and the distance between the transponders and a fixed transceiver of the delimited space is less than the maximum communication distance. Thus, such high frequency communication may also be generated upon exiting the delimited space.

The transponders used are generally of the active type, i.e. including their own energy source. These active transponders or electronic tags or contact-less electronic cards are hereinafter called "portable electronic units". As is shown in European Patent Application No. 1,065,625, the portable electronic units are provided with low frequency communication means and high frequency communication means. Preferably, the electronic units are in standby at a low frequency and are awakened upon receiving a low frequency signal transmitted in the entrance-exit regions, the high frequency communication following in accordance with a given communication protocol.

SUMMARY OF THE INVENTION

In the case of the present invention, the inventors have detected a problem linked to high frequency communication when access to and/or the presence in several neighbouring delimited spaces has to be monitored, as is shown in FIG. 1. This Figure shows schematically and partially the carriages W1 and W2 of a first train 2 and the carriages W3 and W4 of a second train 4 located on a neighbouring parallel track, as can occur particularly in a train station. High frequency transceivers 6 to 11 are arranged inside the carriages. In an entirely schematic way, the zones inside which portable electronic units 20, 22 can receive a signal from one of transceivers 6 to 11 are represented by circles 12 to 17. Likewise, the regions in which units 20 and 22 transmit a high frequency signal able to be received by the transceivers are schematically represented by circles 24 and 26 in dashed lines.

It is clear from FIG. 1 that portable unit 20 can have a two-directional high frequency communication with transceivers 10 and 11 located in two adjacent carriages of train 4. Portable unit 22 located in carriage W3 can have a two-directional communication with transceivers 7 and 10 located respectively in carriages W1 and W3 belonging respectively to the two trains 2 and 4. It will thus be understood that, in the absence of other precautions, communications may be established between a portable unit located in a carriage and fixed transceivers located in other carriages. This may lead, on the one hand, to undesired communications and in particular to an erroneous detection of the presence of persons or objects in a given delimited space. On the other hand, even if precautions are taken to avoid any erroneous detection, in particular by the presence of low frequency transmitters or readers arranged at the entrances to the delimited spaces, the different electromagnetic fields transmitted by the various fixed transceivers and by the portable electronic units generate undesired interactions and in particular jamming of the communications provided when all of the transceivers are operating at the same frequency. This solution appears necessary however on first analysis given that the portable units can enter one or the other of the delimited spaces, without this being predetermined, since the communication system is used in particular, in a preferred embodiment, for detecting and/or localising people in means of transport or delimited neighbouring zones of a building.

One object of the present invention is to resolve the problem explained hereinbefore by providing an efficient communication system and method able in particular to be used for detecting people provided with portable electronic units and able to enter any one of a plurality of delimited spaces provided with high frequency communication means, for example greater than 3 MHz.

The invention therefore concerns first of all a communication system as defined previously characterised in that the plurality of transceivers and the portable electronic units are arranged so as to be able to communicate, among a set of given frequencies and or sub-sets of frequencies respectively associated with said frequencies, at any one frequency and/or frequencies of an associated sub-set of frequencies, and in that each of said transceivers is associated with means for occupying a frequency exclusive thereto, said transceivers including:

listening means arranged to determine whether an occupied signal is present on any frequency among said set of frequencies and/or whether a given amplitude threshold is exceeded upon reception of said frequency;

transmission means arranged to transmit at any frequency of said set of frequencies; and means for selecting, in a period prior to a period of communication with portable electronic units, an exclusive frequency among said set of frequencies which does not contain an occupied signal or whose received amplitude level is less than said threshold.

Transmission means also transmit at the selected exclusive frequency an occupied signal for said exclusive frequency at least periodically during at least said communication period, this communication system having means for communicating information relative to said exclusive frequency to the portable units entering and/or exiting and/or located in the delimited space inside which the transceiver being considered is arranged prior to a high frequency communication being established. In the present description, "occupied signal" means a signal indicative of the occupied state of a frequency, and "exclusive frequency" means a frequency which is exclusive to a transceiver.

In a preferred embodiment, the listening means and the transmitting means are alternately activated at any frequency of said set of frequencies to determine whether this frequency is available and to signal intention to occupy it. In a preferred variant, the selection of an exclusive frequency for a transceiver only occurs after several listening means and transmission means activation alternations, without such frequency being received by the listening means. To prevent the exclusive frequency occupying means associated with two neighbouring delimited spaces which are switched on simultaneously, particularly when the doors of a means of transport are opened, causing the transmission and listening periods to be superposed, the activation period of the listening means is preferably different for occupying means associated with transceivers arranged in neighbouring delimited spaces.

Thus, in order for the system according to the invention to operate, the portable electronic units have to be arranged so as to be able to communicate at any frequency among said aforementioned set of frequencies or frequencies of frequency sub-sets associated with said frequencies, as will be explained in more detail hereinafter. Those skilled in the art know how to design such units wherein the communication frequency can be adjusted and selected from among several predetermined channels.

In a preferred embodiment, the exclusive frequency selected by one or more transceivers located in a given delimited space is communicated to the portable units entering and possibly exiting by one or more low frequency transmitters arranged at the entrances to the plurality of delimited spaces associated with the communication system according to the invention. The low frequency communication is localised in the region of the entrances so that only the portable units which pass through the entrances, in one direction or the other, can receive information as to the exclusive frequency selected. Thus, when an electronic unit is awakened by a low frequency transmitter located in proximity to an entrance to a given delimited space, the transmitter sends an information signal concerning which of the high frequency communication channels has to be used subsequently in accordance with a predefined communication protocol.

The invention also concerns a method for communication between a plurality of transceivers, arranged respectively in delimited spaces next to each other or capable of being so at least temporarily and portable electronic units capable of penetrating such spaces. This method provides the following steps for each transceiver in a period prior to a high frequency communication period:

listening at a first frequency of said set of frequencies to determine whether an occupied signal is present on this first frequency and/or whether a given amplitude threshold is received for this first frequency;

changing channel to listen at another frequency of said set to determine whether an occupied signal is received on said first frequency or whether the amplitude level received for this first frequency is greater than the threshold; until a frequency is available, which is then selected as the exclusive frequency. This method also includes the following steps:

sending an occupied signal for said selected exclusive frequency, so that it is not subsequently taken by transceivers arranged in neighbouring delimited spaces, at least during a subsequent period of communication at the selected exclusive frequency and/or a frequency of a sub-set of frequencies associated with this exclusive frequency;

communicating the exclusive frequency selected for a high frequency communication to the electronic units entering and/or exiting and/or located in the delimited space being considered.

According to a preferred variant, as soon as an exclusive frequency is selected, the transmission means continue to transmit an occupied signal at this exclusive frequency without interruption, periodically or continuously, until the beginning of said communication period and throughout said period.

As a result of the communication method according to the invention, it is possible to select in a reliable manner, an available frequency as the exclusive communication frequency for a transceiver or transceivers associated with a same delimited space. Indeed, the method according to the invention efficiently determines whether a frequency is available and correctly informs other occupying means associated with other transceivers of the fact that a given frequency has been selected to avoid these other occupying means selecting a frequency which has already been taken.

Other features and advantages of the present invention will also appear from the following description, made with reference to the annexed drawings, given by way of non-limiting example, in which:

BRIEF DESCRIPTION OF THE DRAWINGS

FIG. 5 shows schematically the implementation of a collision-avoidance protocol for several high frequency transceivers able to be implemented in the communication method according to the invention.

DETAILED DESCRIPTION OF THE INVENTION

Figure 1:
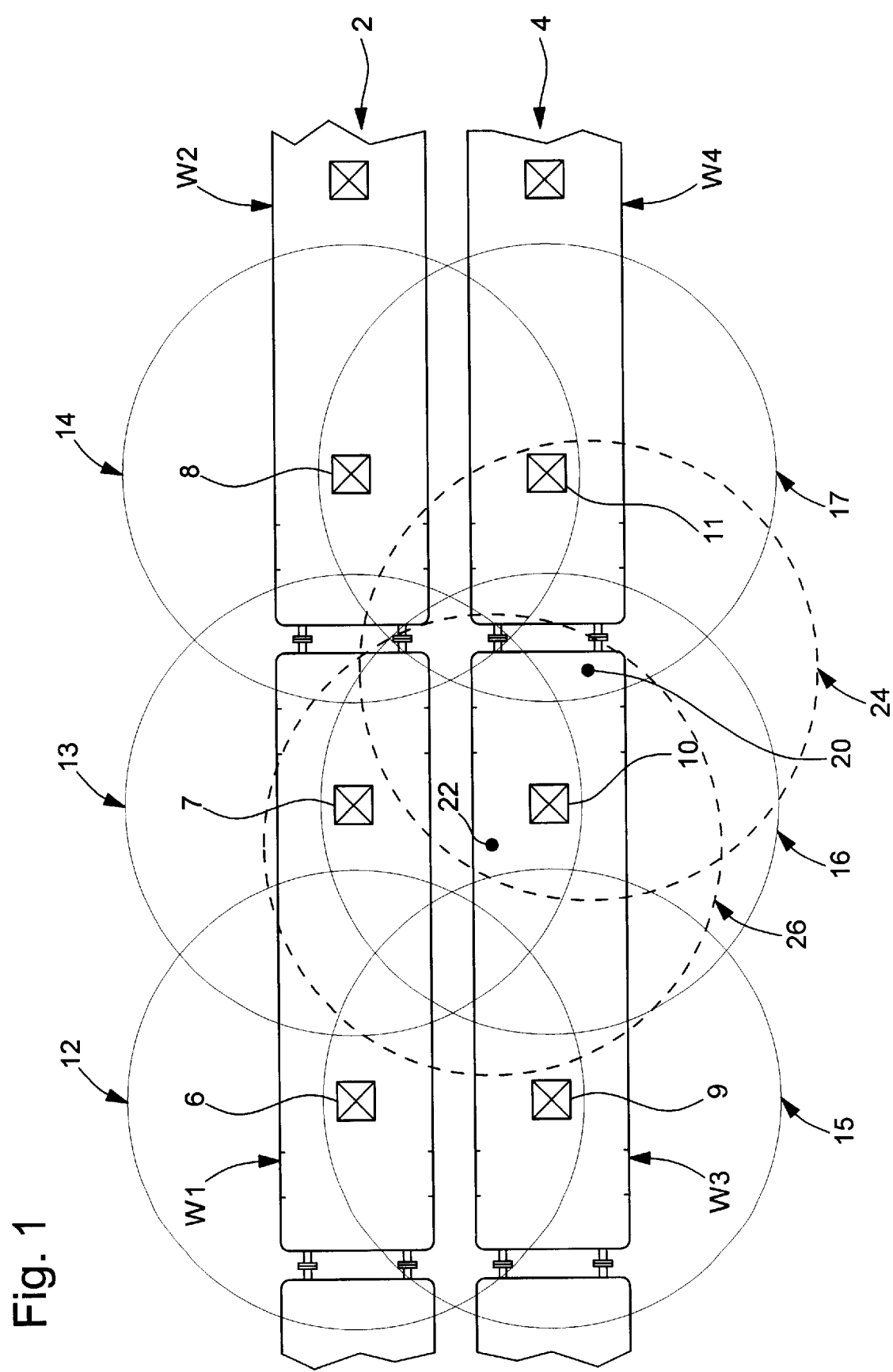
FIG. 1 which has already been described, shows schematically carriages of two trains provided with high frequency transceivers for wireless communication with portable units provided with their energy source.
Figure 2:
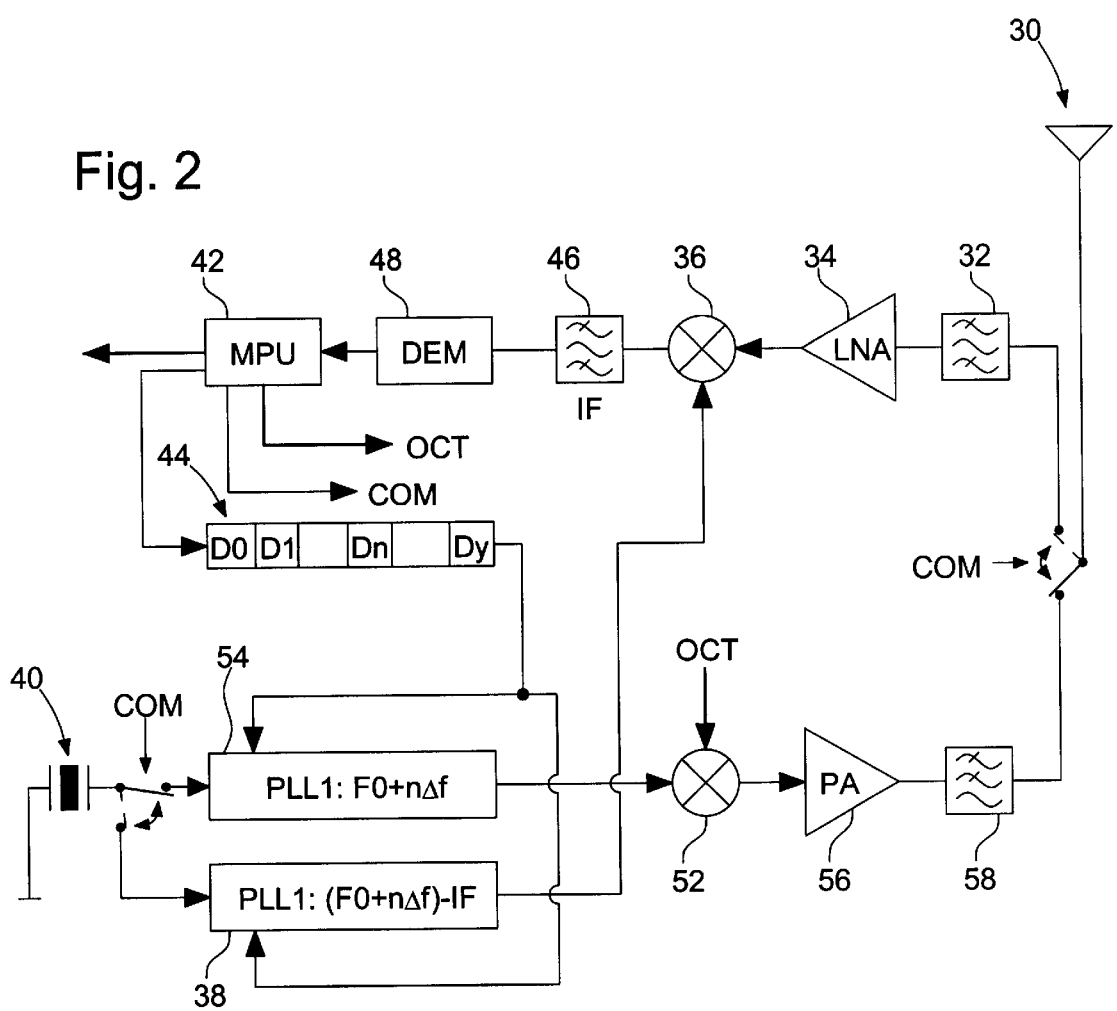
FIG. 2 shows schematically an embodiment of means for occupying an exclusive frequency associated with a transceiver.

FIG. 2 shows an embodiment of means for occupying an exclusive frequency associated with a transceiver of a communication system according to the invention. These occupying means include an antenna 30 able to be used in a listening mode or in a transmission mode. The occupying means include listening means formed by a bandpass filter 32 and a low noise amplifier (LNA) 34. The signal exiting amplifier 34 is supplied to a multiplier 36 which also receives at one of its inputs a sinusoidal signal of a frequency (F0+nΔf)–IF supplied by a phase lock loop (PLL2) 38. Circuit 38 receives at one input a time signal supplied by a time base 40. According to the invention, several frequency channels are available to the various transceivers. This set of frequencies is provided by: F0+nΔf, n=1, . . . , y. It will be noted here that this frequency set may be used only for searching for an available channel, the communication between the transceiver and the portable electronic units being effected at a frequency of a frequency sub-set associated with frequency F0+nΔf.

The selection of n, i.e. of any frequency from among the set of frequencies available, is effected by a microprocessor 42 (MPU) which sends an addressing signal to a register 44 containing for each addressing n, n=0, 1, . . . , y, a corresponding divider Dn which is supplied to circuit 38. This circuit thus sends a frequency signal (F0+nΔf)IF to multiplier 36, IF being an intermediate frequency, for example 455 kHz, corresponding to the central frequency of the narrow band filter 46. Filter 46 supplies at one output a signal whose frequency corresponds to the difference between the frequency of the signal supplied by antenna 30 and the frequency of the signal supplied by circuit 38. Filter 46 is selected so that the bandwidth is less than Δf so as to be able to distinguish the various communication channels provided.

The filtered signal is then supplied to a demodulator 48 (DEM), the demodulated signal being supplied to microprocessor 42 to be processed; in particular to determine whether an occupied signal is being received for a certain frequency, i.e. for a certain n. If for a given frequency channel, no tonality is received during a listening period or if a received signal has an amplitude less than a given threshold, unit 42 sends a control signal COM to switch onto means for transmitting an occupied signal for this channel. In parallel, unit 42 supplies a modulation signal OCT to a multiplier 52 which also receives at one input a frequency signal supplied by a phase lock loop 54 (PLL1). This circuit 54 generates a sinusoidal signal at frequency F0+nΔf defining a carrier for the occupied signal transmitted. In a conventional manner, the signal exiting multiplier 52 is amplified by a power amplifier 56 and passes through a filter 58 before being transmitted by antenna 30.

According to a preferred embodiment of the invention, activation of the listening means and the transmission means is alternated a certain number of times for an available channel able to be selected. This allows one to ensure that the channel is available while sending information as to the intention to occupy the channel on which no occupied signal is being received.

This method of selecting an available frequency among a set of frequencies provided occurs in a period prior to a period of communication between the transceiver being considered and portable electronic units. Preferably, the frequency channel tested first corresponds to that used during a previous communication period. Indeed, the probability of this frequency channel again being available is relatively high. This will always be the case when the neighbouring delimited spaces keep relative fixed positions over time. This is the case for different zones of a fun fair and also for the various carriages of a train that has already been formed. Conversely, when a train is formed anew, the first period prior to a first communication period will be used for each delimited space to select a different exclusive frequency.

If during a listening period, the device shown in FIG. 2 detects that the frequency channel selected is occupied, microprocessor 42 changes addressing n in register 44 to select a new listening channel. Here at least two variants may be envisaged. The first variant consists in having fixed listening and transmission periods, even when the frequency channel is varied. Thus, the listening period for a new channel tested corresponds substantially to the remaining listening time when an occupied signal is received. In the second variant, reception of an occupied signal again initialises a complete listening period for the new channel tested before the signal transmission period. Preferably, the exclusive frequency selection method in a phase prior to a high frequency communication begins with a listening period. However, in a variant, the transmission means may be activated first at a certain frequency.

Selection of a new channel when the tested channel is occupied may occur in various ways. In a first variant, one simply passes to the next channel up, i.e. n+1 and n=y, one passes to n=0. In another variant, other algorithms may also be provided to generate the value of the next n, in particular a pseudo-random algorithm.

It will be noted here that the arrangement of an exclusive frequency occupying means shown in FIG. 2 is in now way limiting and that those skilled in the art may provide other arrangements without departing from the scope of the present invention.

Figure 3:
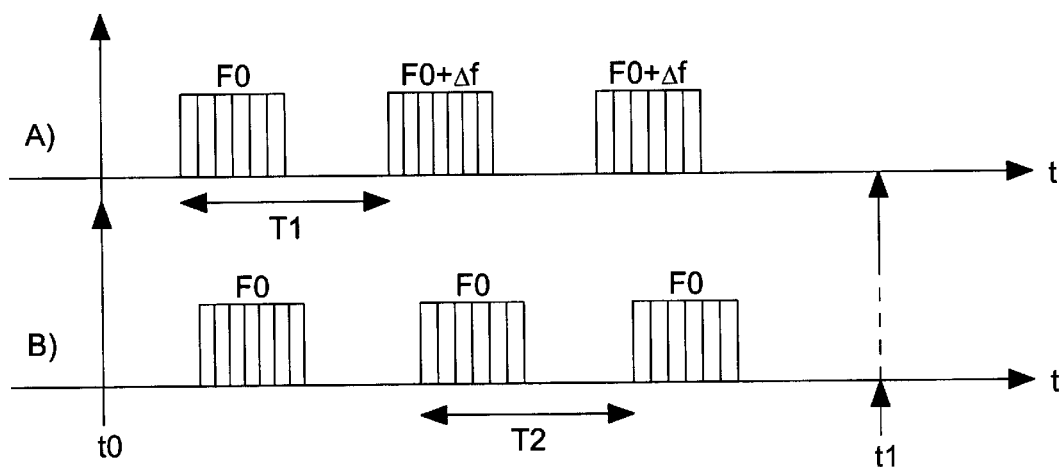
FIG. 3 shows the alternate activation of listening means and transmission means of two occupying means associated with two transceivers respectively arranged in two delimited spaces.

FIG. 3 shows schematically the alternation of the transmission periods and the listening periods in said preliminary phase for two exclusive frequency occupying means associated respectively with two transceivers arranged in two neighbouring delimited spaces. The preliminary phase here begins substantially simultaneously with time t0 and ends at time t1. In the top graph A, the alternation period of the transmission means and the listening means is T1 whereas in the bottom graph B, this period is equal to T2. According to a particular feature of the invention, T1 and T2 are different for different frequency occupying means. This prevents the simultaneously starting of preliminary phases, in particular before the doors of a means of transport are opened, from leading to superposition of the listening periods and transmission periods which would prevent the selection of exclusive frequencies.

In the example of FIG. 3, although the first means corresponding to graph A begin to transmit just before the second means corresponding to graph B, it can be seen that it is the first means which detect an occupied signal for frequency F0. Consequently, these first means pass to frequency F0+Δf. In the absence of reception of any other occupied signals, at the end of the preliminary phase, the first means will thus have selected the frequency F0+Δf whereas the second means will have selected frequency F0.

Figure 4:
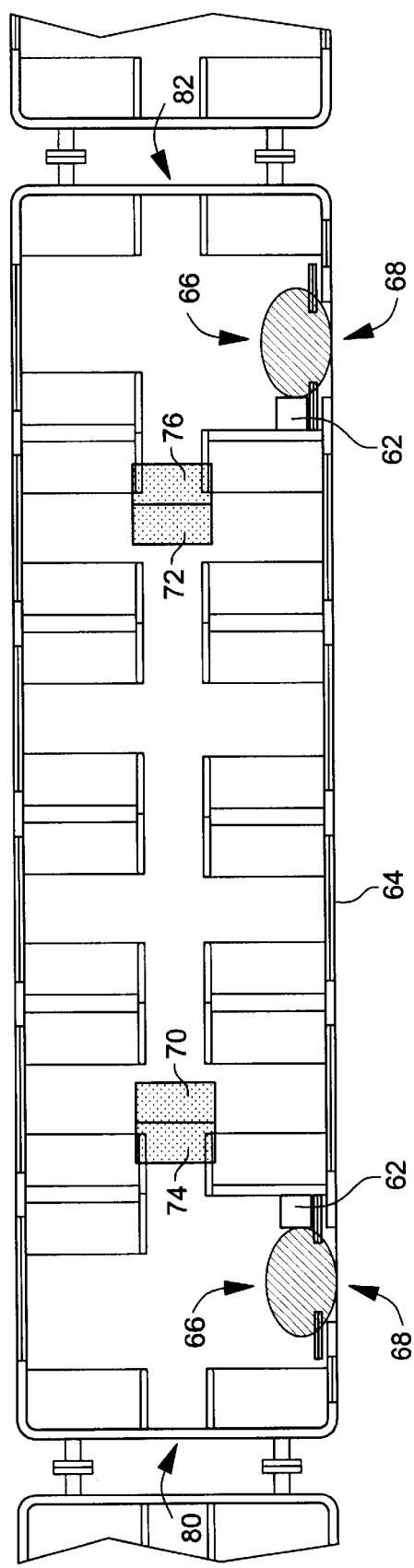
FIG. 4 shows schematically the arrangement of a delimited space according to a preferred embodiment.

Once an exclusive frequency has been selected, it is necessary to communicate the corresponding channel to the portable electronic units entering and/or exiting and/or located inside a delimited space being considered. As shown in FIG. 4, it is advantageously possible to communicate this information in the entrance zones by means of a transmitter 62 arranged in carriage 64 which transmits a low frequency signal in region 66 localised at entrance 68 and passing therethrough. Two high frequency transceivers 70 and 72 associated with exclusive frequency occupying means with two antennae are arranged inside carriage 64. Various alternative embodiments may be provided as a function of the configuration of the delimited spaces and the arrangement of transceivers 70 and 72. Antennae 74 and 76 may be located in cases of the HF transceivers. In another variant however, antennae 74 and 76 are arranged in cases separate from the HF transceivers and located for example at a shorter distance from transverse walls 80 and 82 of carriage 64. By arranging antennae 74, 76 relatively close to walls 80 and 82, the neighbouring regions of the two carriages adjacent to carriage 64 are covered better. This may make the method of selecting different exclusive frequencies for neighbouring delimited spaces more efficiency.

One may provide, in particular, greater transmission power and/or sensitivity for the exclusive frequency occupying means relative to the HF transceiver provided for communications with the portable electronic units.

Of course, units 70 and 72 may form only HF antennae connected to a central electronic unit for carriage 64.

In a preferred embodiment of the communication method according to the invention, as soon as an exclusive frequency is selected in the preliminary period, the transmission means of said occupying means continue to transmit without interruption an occupied signal for this exclusive frequency, periodically or continuously, until the start of the communication period provided and during the latter. During the communication period, the occupied signal listening means are deactivated. Sending the occupied signal for the exclusive frequency during a communication period can be achieved periodically as in the preliminary phase or continuously or quasi continuously given that listening periods are no longer provided.

Finally, FIG. 5 shows schematically and partially a communication protocol provided with the portable electronic units. Advantageously, several communication channels are provided for each transceiver so as to increase the efficiency of a collision-avoidance protocol. Graphs C, D, E, F correspond respectively to the exclusive frequencies selected by four HF transceivers arranged in 4 different delimited spaces. The frequency sub-sets associated with these exclusive frequencies are provided for communication with the portable electronic units.

Thus, for the transceiver corresponding to graph C, the exclusive frequency selected is F0. The communication frequencies are F1, F2, F3 ... Fx. Frequencies F0 to Fx are uniformly distributed. For the other transceivers, the channels provided for communication are shifted relative to F1–Fx by a value corresponding to the shift of the exclusive frequency selected relative to F0, namely Δf, 2Δf and 3Δf. Thus, each exclusive frequency able to be selected is associated with a sub-set of frequencies which are different to the frequencies of the other frequency sub-sets provided for the HF communication and also different from the frequencies of the exclusive frequency set used for the occupied signals.

What is claimed is:

1. A system for communication between a plurality of transceivers, arranged respectively in a plurality of delimited spaces each having at least one entrance, and portable electronic units fitted with means for radio-communication with said plurality of transceivers, in particular with a view to detecting each of these electronic units which penetrates one of said delimited spaces, wherein said transceivers and said electronic units are arranged to be able to communicate, among a set of given frequencies and/or frequency sub-sets respectively associated with said frequencies, at any frequency and/or frequencies of an associated sub-set of frequencies, each of said transceivers being associated with means for occupying a frequency exclusive thereto, said transceivers including:

listening means arranged to determine whether an occupied signal is present on any frequency among said set of frequencies and/or whether a given amplitude threshold is exceeded upon reception of said frequency;

transmission means arranged to transmit at any frequency of said set of frequencies; and means for selecting, in a period prior to a period of communication with electronic units, an exclusive frequency among said set of frequencies which does not contain an occupied signal or whose received amplitude level is less than said threshold;

said transmission means transmitting at the selected exclusive frequency an occupied signal for said exclusive frequency at least periodically during at least said communication period, this system having means for communicating information relative to said exclusive frequency to the portable units entering and/or exiting and/or located in the delimited space inside which the transceiver being considered is arranged.

2. The system according to claim 1, wherein said exclusive frequency selection means include control means for alternately activating said listening means and said transmission means at any frequency of said set of frequencies and means for passing to another frequency of said set as soon as said occupied signal for this frequency is received by said listening means or the power level received on this frequency is greater than said threshold.

3. The system according to claim 2, wherein the selection of an exclusive frequency only occurs after said listening means and transmitting means have been activated alternately several times, without said frequency being received by said listening means.

4. The system according to claim 2, wherein the period of activation of said listening means is different for each transceiver of said system.

5. The system according to claim 1, wherein said set of frequencies is in the high frequencies, said exclusive frequency selected for a transceiver being communicated to the low frequency electronic units by one or more transmitters placed respectively at said entrance or at the entrances to the delimited space of said transceiver.

6. The system according to claim 1, wherein during said preliminary phase, said listening means are activated firstly at a frequency which was used for a previous communication.

7. The system according to claim 1, wherein each frequency of said frequency set is associated with a sub-set of frequencies which are different from the other sub-sets of frequencies and also different from the frequencies of said frequency set, so as to allow a collision-avoidance protocol to be implemented which distributes the communication frequencies with said electronic units on frequencies of a sub-set of frequencies associated with said exclusive frequency.

8. A method of communication between transceivers, arranged respectively in delimited spaces next to each other or capable of being at least temporarily and portable electronic units fitted with radio-communication means and capable of penetrating these delimited spaces, said transceivers and said electronic units being arranged to allow high frequency communication, among a set of given frequencies and/or sub-sets of frequencies respectively associated with said frequencies, at any frequency and/or frequencies of an associated sub-set of frequencies, this method having, for each transceiver, the following steps in a period prior to a high frequency communication period:

listening at a first frequency of said set of frequencies to determine whether an occupied signal is present on this first frequency and/or whether a given amplitude threshold is exceeded for this first frequency;

changing channel to listen at another frequency of said set of frequencies to determine whether an occupied signal is received on said first frequency or whether the amplitude level received for this first frequency is greater than said threshold; until a frequency is available, which is then selected as the exclusive frequency, this method further including the following steps:

sending an occupied signal for said selected exclusive frequency, so that it is not subsequently taken by transceivers arranged in neighboring delimited spaces, at least during a subsequent period of communication at the selected exclusive frequency and/or at a frequency of said sub-set of frequencies associated with this exclusive frequency;

communicating, to the electronic units entering and/or exiting and/or located in the delimited space being considered, information relative to the exclusive frequency selected for a high frequency communication.

9. The communication method according to claim 8, wherein the communication of information relative to said selected exclusive frequency is effected at a low frequency by transmitters located at the entrances to said delimited spaces.

10. The method according to claim 8, wherein during said preliminary period, a signal is transmitted alternately with listening at a same frequency of said set of frequencies, said selection of said exclusive frequency occurring only after a certain number of listening-transmitting alternations.

11. The method according to claim 10, wherein the period of listening-transmitting alternations is different for each delimited space.

12. The method according to claim 10, wherein as soon as an exclusive frequency is selected, said transmitting means continue to transmit said signal at said exclusive frequency without interruption, periodically or continuously, until the start of said communication period and during the latter, this signal forming said occupied signal.

13. The method according to claims 10 wherein said listening means are deactivated during said communication period.

14. The method according to claims 8, wherein said listening means are deactivated during said communication period.

* * * * *